Feb. 2, 1932.    R. R. ROEMER    1,843,631
CONSTRUCTION SHORE
Filed Sept. 12, 1928
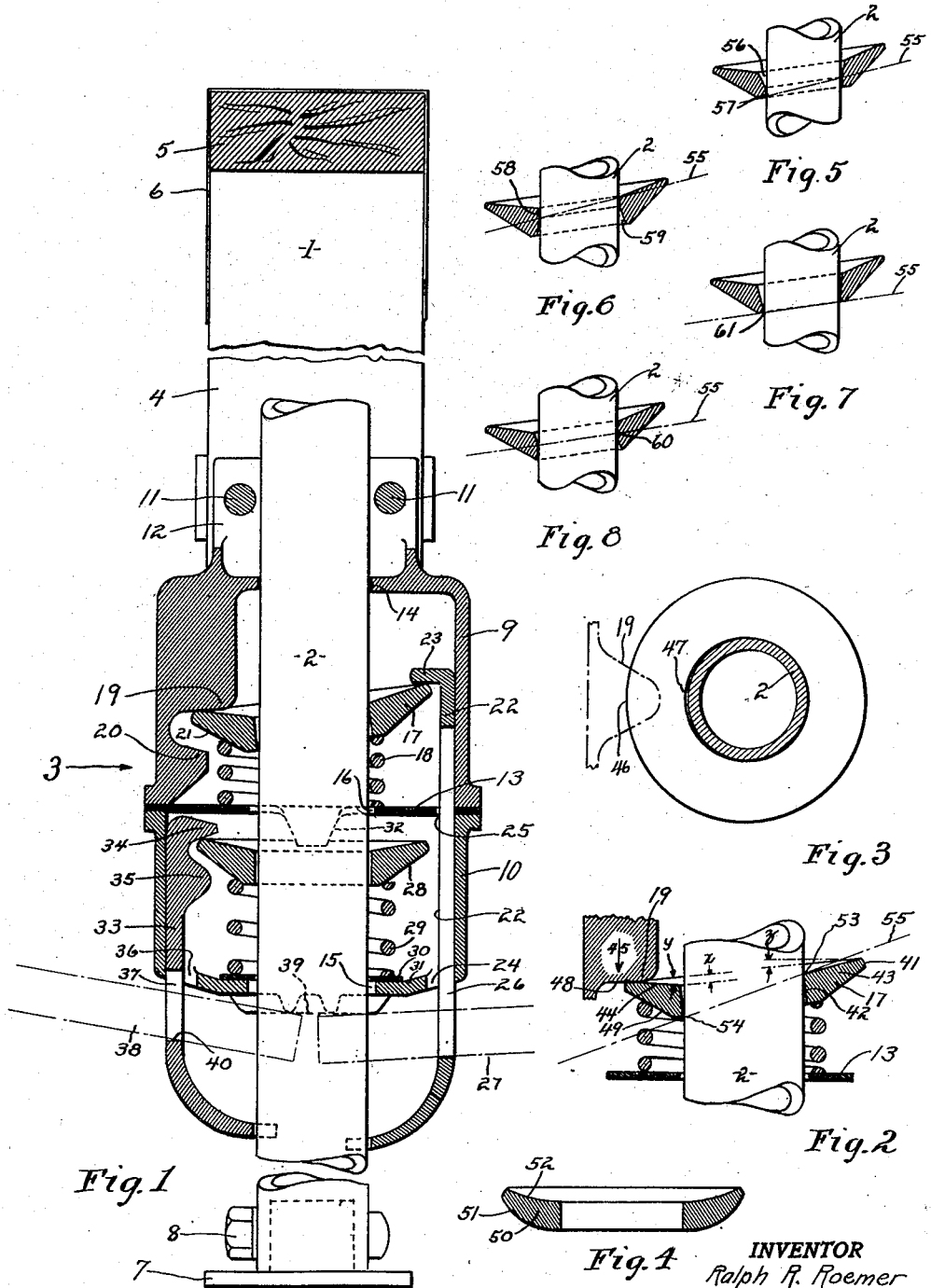
INVENTOR
Ralph R. Roemer
BY
Harry P. Canfield
ATTORNEY Patented Feb. 2, 1932

1,843,631

UNITED STATES PATENT OFFICE

RALPH R. ROEMER, OF CLEVELAND, OHIO

CONSTRUCTION SHORE

Application filed September 12, 1928. Serial No. 305,394.

This invention relates to adjustable construction shores.

Adjustable construction shores usually consist of two main column members arranged to be longitudinally telescoped with respect to each other, to adjust the overall length of the shores; and consist further of a clutch device for adjusting their overall length as a column and for locking the two members together at any adjusted length to adapt them for use as a rigid supporting column. Various types of clutch device have been proposed.

One general type of adjustable construction shore employs two longitudinally telescoping column members upon one of which the load is applied and the other of which is constructed of pipe or other tubular material preferably circular in cross section; and the clutch device therefore comprises a so-called canting and gripping plate or washer encircling the said tubular member, adapted to grip it when canted or tilted thereon; and the load carried by the shore is transmitted by the clutch device to the canted plate and thence to the tubular shore member.

The invention of this application relates particularly to construction shore clutch devices employing the canting plate principle.

One of the objects of this invention is to provide an adjustable construction shore clutch device employing an improved form of canting plate or canting washer.

Another object is to provide an improved canting plate for construction shore clutch devices which is of improved form and cross sectional shape whereby it presents the following advantages and performs the following functions:

It has the maximum of strength to resist the forces set up therein when in use with the minimum of material, whereby superior and expensive material may be employed at the minimum of cost; the plate functions as a centering device for a spring forming part of the clutch device and operatively associated with the plate and also maintains the said spring in a balanced or equalized condition; the load supported by the shore and carried by the canting plate is transmitted to the shore member, which the plate encircles or embraces, almost wholly in the longitudinal direction and with little or no radial or crushing force on the encircled shore member thus obviating the necessity of providing against the effects of such a crushing force in said member; the plate is adapted for use in the clutch device in a normally canted position to carry the load applied on the shore and may also be employed in the clutch device in a normally uncanted position and adapted to be canted to serve as a reaction point, base or fulcrum at which an operating force may be applied to increase or decrease the adjustable overall length of the shore.

Other objects will be apparent to those skilled in this art from the following description of embodiments thereof taken in connection with the accompanying drawings, illustrating the said embodiments and in which, Fig. 1 is a cross sectional view of a shore and clutch device employing my invention, some of the parts being broken away;

Fig. 2 is a view similar to Fig. 1 but showing some of the parts only;

Fig. 3 is a plan view, in some respects diagrammatic, of the parts shown in Fig. 2;

Figs. 4, 5, 6, 7 and 8 are views of a canting washer shown in Figs. 1, 2 and 3 but showing modifications thereof.

In connection with the following description, reference may be had to my correlative co-pending application Serial No. 304,885, filed September 10, 1928.

Referring to the drawings, I show in general at 1, the upper telescoping shore member, at 2, in general, the lower telescoping shore member, and, at 3, in general the clutch device. The upper shore member 1 comprises a vertically arranged column or support preferably composed of two or more parallel wood struts 4 and surmounted by a head or cap 5 secured thereto by a strap or straps 6.

The lower telescoping member 2, is, preferably tubular, as shown, and circular in cross section. The lower end thereof is provided with a foot 7 bolted thereto as at 8. The lower member 2, the foot 7 and the upper member 1 and cap 5 may be of any known or suitable construction and form no essential part of my invention.

The clutch device 3 comprises a cage or housing composed of an upper portion 9 and a lower portion 10. The upper portion 9 is bolted by bolts 11, 11, to the lower end of the wooden shore members 2, lugs 12 being provided on the housing member 9 for this purpose. The housing members 9 and 10 are, in general, of cup shape, their open ends facing each other and abutting upon a partition member 13 preferably formed from sheet metal; and the upper and lower portions 9 and 10 and partition 13 are all secured rigidly together in the position shown by bolts or other means not illustrated. The housing thus formed surrounds the lower member 2, and together with the upper shore member 1 to which it is secured is longitudinally movable along the lower member 2, the upper housing portion 9 being provided with a central bore 14, and the lower portion 10 with an opening 15 and the partition 13 with an opening 16 to admit the member 2 therethrough.

In the upper housing portion 9, a canting plate or washer 17 to be more fully described is provided, encircling the lower shore member 2 and is pressed upwardly as viewed in Fig. 1, by compression spring 18, the lower end of which abuts upon the partition 13 and the upper end of which abuts on the lower face of the washer 17. The upper thrust of the spring 18 holds the washer 17 against a post or fulcrum 19 formed on the inner wall of the upper housing portion 9 and overhanging the outer edge or periphery of the washer 17. Since there is only one fulcrum 19, the thrust of the spring 18 causes the washer 17 to cant out of the horizontal position. As viewed in Fig. 1 a shoulder 20 is provided below and spaced from the fulcrum 19 and from the lower face 21 of the washer for a purpose to be described. A hook device 22 having a lip 23 overhanging the edge of the washer 17 at a point opposite the fulcrum 19 is provided to rock the washer 17 back into the horizontal position when desired for an operative purpose to be described, and the body 22 of the hook extends downwardly through an aperture 25 in the partition 13 and on through an aperture 24 in the lower end or bottom of the housing portion 10; and below the portion 10 the hook has an opening 26 through which a pinch bar or other tool 27, indicated in broken lines, may be inserted and operated as a lever with the bottom of the housing portion 10 as a fulcrum to pull the hook downwardly and rock the plate 17; but the hook 22 and its functions form no essential part of my invention.

In the lower housing portion 10 a second canting washer 28 is provided, encircling the lower shore member 2, and pressed upwardly as viewed in Fig. 1 by a compression spring 29 the lower end of which abuts upon a sealing or dust proof washer 30 supported by the lower floor 31 of the housing member 10 and the upper end of which abuts upon the lower face of the canting washer 28. The upward thrust of the spring 29 holds the washer 28 against two downwardly projecting lugs 32 formed on the partition 13, one only of which is shown in dotted line. The lugs 32 are disposed diametrically and symmetrically with respect to washer 28 and the lower ends of the lugs 32 are squared off horizontally so that the thrust of the spring 29 holds the washer 28 normally in a horizontal or uncanted position. A hook device 33 having a lip 34 overhanging the upper edge of the washer 28 and having a shoulder 35 adjacent to the lower face of the washer is provided, supported by the washer and extending downwardly through an aperture 36 in the housing portion 10 and having an opening 37 through which a pinch bar or other tool 38 indicated in broken lines may be inserted and operated as a lever, with the bottom of the portion 10 as a fulcrum, to rock or tilt the washer 28 out of its normal horizontal position into a canted position to grip the tubular member 2 of the shore for a purpose to be described.

The foregoing description applies to the shore and clutch device, in general, and does not relates particularly to my invention and before proceeding to a disclosure of the essentials of my invention the general operation of the shore and clutch device will now be described.

When the shore is standing on the foot 7, the weight of the upper member 1 and any load that may be thereon is transmitted to the upper housing portion 9 and thence through the fulcrum 19 to the canting plate or washer 17 which, being in its canted position, grips the lower shore member 2 and transmits the load to the latter. In view of the present development of this art, it is deemed unnecessary to further describe, in general, the gripping action of the canting plate 17 on the lower shore member 2. If it be desired to lower the upper member 1 or shorten the overall length of the shore, a pinch bar or other tool 27, is inserted through the opening 26 in the hook device 22, the inner end engaging the bottom 39 of the lower housing portion 10. The outer end of the bar 27 is then depressed and the hook device 22 is thereby drawn downwardly thus uncanting the washer 17 and allowing the housing 3 and upper shore member 1 to slide downwardly by gravity on the lower shore member 2. If it be desired to raise the upper shore member 1 a pinch or other tool 38 is inserted through the opening 37 in the hook device 33 the inner end of the bar engaging the floor 39 of the lower housing portion 10. When the outer end of the bar 38 is depressed, the hook device 33 is pulled downwardly, the lip 34 engages the washer 28 and rocks it into a canted position causing it to grip the lower shore member 2; further depression of the bar 38 will cause it to rock upon the lower side or sill 40 of the opening 37 and cause the inner end of the bar to exert an upward thrust upon the housing 3, causing it and the upper shore member 1 to move upwardly. The upward movement of the upper housing portion 9 carries the fulcrum 19 and shoulder 20 with it. Normally the removal of the load from the upper washer 17 by the movement of the fulcrum 19 will permit the spring 18 to break the grip of the washer 17 on the tubular lower shore member 2 so that the washer 17 will freely slide upwardly on the lower shore member 2 with the upward movement of the other parts, but if the washer 17 should tend to stick to the tubular shore member 2, the upper movement of the shoulder 20 will cause it to engage the washer 17 on the lower face 21 thereof and loosen it. Upon releasing the bar 38, the load is again taken up and held by the washer 17 and the washer 28 is returned to its normal uncanted position by the spring 28. If the washer 28 should stick on the lower shore member 2, the hook device 33 may be moved or knocked upwardly in any convenient manner as by striking it a slight blow which will cause the shoulder 35 to engage the washer 28 to break it loose.

We come now to a consideration of the essential features of my invention which are embodied in the canting plate, and the parts associated therewith. The canting plate or washer 17 is, in general, of the form of a dish. At the outer periphery as at 41, Fig. 2, the washer is relatively thin; at the inner periphery as at 42, it is relatively thick; the upper face of the washer is dished so that at the outer edge it stands higher than at the inner periphery as viewed in Fig. 2 by the amount $x$. Thus the cross sectional shape on a radial plane through the axis of the washer is in general triangular as shown at 43. The upper line 44 of the triangular cross section is at an angle $y$ with a line at right angles to the axis of the washer.

In constructing the shore employing my improved canting washer, it is, of course, preferable for matters of economy to use for the lower shore member 2, tube or pipe of standard commercial thickness and diameter. Inasmuch as such commercial pipe varies in diameter the maximum outside diameter to be met with is first obtained. The diameter of the hole of the washer is then determined, allowing a small clearance, preferably such as four to six one hundredths of an inch on the diameter. This amount of clearance I find to be sufficient to permit the washer to slide freely over the tubular shore member 2 inclusive of its departure from a true cylinder and of incidental roughness of surface caused in manufacture and caused subsequently by the gripping of the washer itself thereon underload. The outer diameter of the washer may be arbitrarily chosen but should be approximately twice the diameter of tubular shore member 2 for shores required to carry the load met with in ordinary construction work. To determine the thickness of the washer as at 42 and the angle $y$, the washer may be considered as in Figs. 2 and 3 where it is shown encircling the tubular shore member 2. It will be noted that the load is applied to the washer by the lower face of the fulcrum 19 where it rests upon the washer 17 at the outer edge 46 of the washer. The direction of the load is vertical as indicated by the arrow 45. The washer may, therefore, be considered, mathematically, as a beam, held fixed rigidly at one end (inner periphery as at 47) and with the load concentrated on the other end (outer edge 46) and for a given maximum load the cross sectional shape and thickness of the washer may be calculated by the usual methods. The thickness of the washer at 46, is calculated to sustain the shearing force at that point, there being little or no bending force. The angle $z$ which the washer takes up with the horizontal will depend, of course, both upon the size of the hole in the washer and the thickness of the washer at the inner periphery 42 on which it grips when canted; and the shape of the triangular cross section 43 is so chosen that the washer will be dished by an angle $y$ slightly greater than angle $z$, in order that when the washer is in the canted position as in Fig. 2, the face 44 of the washer will not be horizontal, but will slope slightly downwardly toward the axis of the washer. The purpose of this is to insure that the lower face 48 of the fulcrum 19 if made horizontal or substantially horizontal will never engage the washer except at its extreme outer periphery. Were it not for this provision, or if the washer were not dished at all, or insufficiently dished on its upper surface, then, in the first place, the fulcrum 19 might engage the washer near the inner periphery and might not cause it to cant; or if it canted it might not cause it to grip; and in the second place, the fulcrum 19, would be acting upon its sloping surface and would, under load, exert a lateral or radial thrust of the washer against the tubular member 2, tending to crush it; the same radial crushing force would likewise be present with an undished washer if the face 48 of the fulcrum 19 were sloped to insure its engagement only with the outer edge of the washer, as will be understood. As, is well known in shores employing tubular lower members, it has heretofore, been necessary, in some cases, to fill the tube with concrete to prevent the clutch device from crushing the tube and as will now be clear, by means of my improved clutch device and canting washer the added weight and expense of such a filler is eliminated. The radial component of the load is rendered negligible by employing a face 48 on the fulcrum 19 substantially at right angles to the tubular member 2 and by dishing the upper face of the washer by the angle $y$ greater than the angle $z$.

By making the cross section of the washer as at 43 generally triangular and by dishing the upper face of the washer, the lower face of the washer, may, thereby, be made conical for the following purpose. As described above and as shown in Figs. 1 and 2, the washer 17 which is thrust upwardly by the spring 18, lies at an angle $z$ with the axis of the tubular member 2. If the lower face 21 of the washer, were, say, planular, then a spring having the usual squared ends would engage the washer only at one side thereof, and the spring would be bent with its axis out of the vertical and it would foul with and rub on the tubular member. By making the washer conical on its lower face 21 the upper end of the spring 18 may find a seat thereon with its upper squared end horizontal and the axis vertical, and the conical face of the washer entering the spring serves as a centering device to prevent the spring from drifting over against the tubular member.

As indicated in Fig. 1, the lower washer 28 may be a duplicate of the upper washer 17 and the spring 29 may be a duplicate of the spring 18 and the conical lower face of the lower washer 28 may be employed for the purposes described above in connection with the upper washer 17.

As shown in Fig. 2 the washer has a cross sectional shape generally triangular as at 43 and the upper and lower lines 44 and 49 of this section are straight lines. In Fig. 4 I show a modification in which the washer has the concave upper face and convex lower face and a generally triangular cross section 50 but the lines 51 and 52 of which are curved giving dome shaped upper and lower washer faces.

In the washers of Figs. 1 to 4 inclusive the hole of the washer is cylindrical, and when the washer is canted on the tubular member 2 it grips it between a point or portion 53, (Fig. 2) at the upper end of this cylinder and at a point or portion 54 on the lower end of this cylinder and on the diametrically opposite side of the cylinder from the point 53, thus determining the contact line 55. I find that the more nearly horizontally the line 55 is, the more positive, certain and, therefore, safe is the gripping action of the washer. When the thickness of the washer must, for purposes of strength, be made relatively great, as when great loads are to be supported, the slope of the contact line 55 may be so steep that the washer will not grip at all. In order to keep the contact line 55 at a small angle with the horizontal for all thicknesses and strengths of washer, I may employ one of the modifications shown in Figs. 5 to 8 inclusive.

In Fig. 5 the upper portion of the hole in the washer is conical, enlarging upwardly, as shown at 56 and the lower portion only is cylindrical as shown at 57 and the cylindrical portion extends for a relatively short distance axially so that the line of contact 55 is nearly horizontal.

The form shown in Fig. 6 is similar to that of Fig. 5 except that the cylindrical portion 58 is in the upper part of the hole and the conical portion 59 in the lower.

In the modification shown in Fig. 8 the cylindrical part of the hole is substantially at the middle axially at 60 and the hole expands upwardly and downwardly therefrom. The cylindrical portion is so short axially that the line of contact 55 is very nearly horizontal. The hole in this washer resembles the hole in a doughnut. In the modification shown in Fig. 7, the hole tapers from one end to the other, and is smallest at the bottom. The gripping portion, is therefore, hardly a cylinder at all, but is substantially a circular edge 61 and the line of contact 55 lies on the lower face of the washer and is very nearly horizontal.

It is obvious that other forms of washer may be devised but it is believed the forms shown and described fully disclose the principles of my invention. In Figs. 1, 2 and 3 showing the washer in a clutch device, I have illustrated the simplest form, but, in practice, I prefer the forms of Figs. 5 to 8 inclusive.

My invention is not limited to the exact forms of washers shown and described nor to the shapes and proportions thereof illustrated, since these will vary with the loads to be carried, the kind and characteristics of material employed in the washer, the diameter of the tubular member 2 and the diameter of the washer, itself, etc.; and it is believed that the foregoing disclosure is sufficient to enable those skilled in the art to calculate and design washers suitable for any clutch device such, for example, as the shore clutch device illustrated and described hereinbefore.

While I have shown and described a canting and gripping plate of circular washer form it will be understood that the principles underlying my invention may be embodied in canting plates that are not circular nor of washer form; and for use with shore column members that are not circular in cross section. In the claims the word "washer" is to be taken as meaning, generally, a plate with a hole in it regardless of the shape of the plate or of the hole.

My invention is not limited, in its application to shores, but may be used wherever clutch devices of the general character described are employed.

I claim:—

1. A canting and gripping element for a clutch device comprising a washer having a hole of varying diameter a portion of which is cylindrical.

2. A canting and gripping element for a clutch device comprising a washer concave on one side and having a hole of varying diameter, a portion of which is cylindrical.

3. A canting and gripping element for a clutch device comprising a washer concave on one side and convex on the other and having a hole of varying diameter, a portion of which is cylindrical.

4. A canting and gripping element for a clutch device comprising a washer, concave on one side, convex on the other, and shaped to have a generally triangular cross section on a radial plane, with the base thereof at the hole and the apex at the outer peripheral edge and having a hole of varying diameter, a portion of which is cylindrical.

5. A canting and gripping element for a clutch device comprising a washer thicker adjacent to the hole than at the outer edge, concave on one face, the hole of which is of varying diameter and a portion of which is cylindrical.

6. In a shore, a pair of vertical telescoping shore members, a clutch device, comprising a canting washer encircling one of the members rotatable thereon and adapted to grip it when tilted thereon at an angle with the horizontal, a fulcrum in the clutch device having a face generally horizontal and adapted to rest on the washer to tilt it and to transmit to it the load of the other shore members, the upper face of the washer being dished and provided with a peripheral edge substantially symmetrically disposed around the axis of the washer and elevated sufficiently to adapt the face of the fulcrum to rest upon the washer at its peripheral edge only, in any rotated position.

7. A canting and gripping element for clutch devices comprising a washer, a face of which is dished to provide an elevated peripheral edge substantially symmetrically disposed around the axis of the washer.

8. A canting and gripping element for clutch devices comprising a washer convex on one side and on the other side dished to provide an elevated peripheral edge substantially symmetrically disposed around the axis of the washer.

9. A canting and gripping element for clutch devices comprising a washer, convex on one side, dished on the other side to provide an elevated peripheral edge substantially symmetrically disposed around the axis of the washer and formed to have a generally triangular cross section on radial planes with the base of the triangle adjacent the hole in the washer and the apex thereof adjacent the peripheral edge.

10. A canting and gripping element for clutch devices comprising a washer the hole of which is of varying diameter and the external perimeter of the washer being substantially symmetrically disposed around the axis of the washer.

11. A canting and gripping element for clutch devices comprising a washer dished on one side to provide an elevated peripheral edge substantially symmetrically disposed around the axis of the washer and having a hole of varying diameter.

12. A canting and gripping element for clutch devices comprising a washer dished on one side to provide an elevated peripheral edge substantially symmetrically disposed around the axis of the washer, convex on its other side and having a hole of varying diameter.

13. A canting and gripping element for clutch devices comprising a washer the perimeter of which is disposed substantially symmetrically around the axis of the washer and being thicker at points adjacent the hole than at points nearer the peripheral edge.

14. A canting and gripping element for clutch devices comprising a washer having an elevated peripheral edge disposed substantially symmetrically around the axis of the washer and being thicker at points adjacent the hole than at points nearer the peripheral edge, and having a hole of varying diameter.

15. A canting and gripping element for clutch devices generally of disk form having a dished face, a peripheral edge substantially symmetrically disposed around the axis of the disk and an axial perforation of cylindrical form.

16. A canting and gripping element for clutch devices generally of disk form having a dished face, a peripheral edge substantially symmetrically disposed around the axis of the disk and an axial perforation having a portion thereof of cylindrical form, the axial length of the cylindrical portion being less than the thickness of the washer at points between the cylindrical portion and the periphery.

17. A canting and gripping element for clutch devices generally of disk form and provided with an axial perforation having a portion thereof of cylindrical form, the axial length of the cylindrical portion being less than the thickness of the washer at points between the cylindrical portion and peripheral edge of the washer.

18. A canting and gripping element for clutch devices comprising a body having a generally circular periphery and an axial bore a portion of which is of cylindrical form, the bore at one axial end thereof being flared out conically at a relatively small conical angle, and the corresponding axial face of the body being dished between the base of said conical portion and the periphery of the disk to provide an elevated peripheral edge on the body substantially symmetrically disposed around the axis, the body being thickest adjacent the bore and in cross-section on radial planes through the axis tapering in thickness toward the peripheral edge.

In testimony whereof, I have hereunto signed my name.

RALPH R. ROEMER.